US012679184B2

(12) United States Patent (10) Patent No.: US 12,679,184 B2
Andersson et al. (45) Date of Patent: Jul. 14, 2026

(54) DOOR TILTING SYSTEM AND A METHOD FOR ADJUSTING A DOOR TILTING SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Kaj Andersson, Mellerud (SE); Fredrik Wallander, Pixbo (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 266 days.

(21) Appl. No.: 18/672,797

(22) Filed: May 23, 2024

(65) Prior Publication Data

US 2024/0308308 A1     Sep. 19, 2024

Related U.S. Application Data

(63) Continuation of application No. PCT/CN2022/138008, filed on Dec. 9, 2022.

(30) Foreign Application Priority Data

Dec. 15, 2021     (EP) ..................................... 21214830

(51) Int. Cl.
B60J 5/06 (2006.01)
E05D 15/10 (2006.01)
(52) U.S. Cl.
CPC .............. B60J 5/06 (2013.01); E05D 15/101 (2013.01); E05Y 2600/56 (2013.01); E05Y 2900/531 (2013.01)

(58) Field of Classification Search
CPC .. B60J 5/06; E05D 15/101; E05D 2015/1031; E05D 5/14; E05D 7/0054; E05Y 2600/56;
(Continued)

(56) References Cited

U.S. PATENT DOCUMENTS

2005/0150166 A1* 7/2005 Seksaria ................ B60J 5/0416
49/502
2012/0031004 A1* 2/2012 Boettcher .................. B60J 5/06
49/154
(Continued)

FOREIGN PATENT DOCUMENTS

DE         4240361 A1     6/1994
EP         3150786 A1     4/2017
(Continued)

OTHER PUBLICATIONS

Extended European Search Report from corresponding European Application No. 21214830.8, mailed on Jun. 10, 2022, 7 pages.
(Continued)

*Primary Examiner* — Muhammad Shafi
(74) *Attorney, Agent, or Firm* — Tucker Ellis LLP

(57) ABSTRACT

A door tilting system for a slidable vehicle door, and a method for adjusting a door tilting system, where the door tilting system forms part of a pivoting joint between the vehicle door and a movable arm structure connecting the vehicle door to a vehicle body structure. The door tilting system includes an inner socket and an outer socket, where the inner socket is arranged inside the outer socket and rotatably arranged relative to the outer socket. The inner socket includes a receiving opening configured for receiving a fastening device. The receiving opening has an elongated configuration, and the receiving opening is extending in a first direction along a first axis through the inner socket. The door tilting system is configured for changing the first direction of the receiving opening relative to the outer socket
(Continued)

upon rotational displacement of the inner socket relative to the outer socket.

11 Claims, 9 Drawing Sheets

(58) Field of Classification Search
CPC ......... E05Y 2900/531; E05Y 2201/624; E05Y 2201/632; E05Y 2201/638; E05Y 2201/682; E05Y 2600/10; E05Y 2600/12; E05Y 2600/502; E05Y 2600/632; E05Y 2800/296
USPC ........................................................ 296/155
See application file for complete search history.

(56) References Cited

U.S. PATENT DOCUMENTS

| | | | | |
|---|---|---|---|---|
| 2017/0291477 | A1* | 10/2017 | Elie | E05F 15/00 |
| 2019/0301226 | A1* | 10/2019 | Kaburaki | E05D 3/127 |
| 2020/0102777 | A1* | 4/2020 | Yun | B60J 5/0479 |
| 2020/0317033 | A1* | 10/2020 | Sordelli | E05D 7/00 |
| 2022/0290477 | A1* | 9/2022 | Bender | E05D 5/12 |
| 2022/0305888 | A1* | 9/2022 | Ritz | B60J 5/06 |

FOREIGN PATENT DOCUMENTS

| | | |
|---|---|---|
| JP | 2007192015 A | 8/2007 |
| KR | 19990064501 A | 8/1999 |
| KR | 20040100075 A | 12/2004 |
| WO | 2017111749 A1 | 6/2017 |
| WO | 2020204859 A1 | 10/2020 |

OTHER PUBLICATIONS

International Search Report from corresponding International Application No. PCT/CN2022/138008, mailed on Mar. 27, 2023, 3 pages.

* cited by examiner

DOOR TILTING SYSTEM AND A METHOD FOR ADJUSTING A DOOR TILTING SYSTEM

RELATED APPLICATION DATA

This application is a continuation of International Patent Application No. PCT/CN2022/138008, filed Dec. 9, 2022, and claims the benefit of European Patent Application No. 21214830.8, filed Dec. 15, 2021, the disclosures of which are incorporated herein by reference in their entireties.

TECHNICAL FIELD

The present disclosure relates to a door tilting system for a slidable vehicle door. The door tilting system is forming part of a pivoting joint between the vehicle door and a movable arm structure connecting the vehicle door to a vehicle body structure. The disclosure further relates to a vehicle comprising at least one door tilting system and a method for adjusting a door tilting system for a slidable vehicle door.

BACKGROUND

There are different types of vehicle doors that are allowing access to an interior compartment of the vehicle, and conventional door constructions are for example hinged vehicle doors that are pivotably connected to a vehicle body structure via hinges, or sliding vehicle doors that are slidingly connected to a vehicle body structure via rails and movable arm structures. On a conventional hinged vehicle door, the door connection geometry is commonly set by three connection points formed by two hinges and a door-locking latch. On a conventional sliding door, the door connection geometry is commonly set by three connection points formed by rails and movable arm structures. These connection points can be adjusted to give correct door position relative to the vehicle body structure in longitudinal, lateral and vertical vehicle directions. A correct door position is essential for a sealed connection between the vehicle door and the vehicle body structure, preventing noise, dust, and other contaminants, from entering the interior compartment. A correct door position is further essential for an aesthetically correct positioning of the vehicle door relative to the vehicle body structure. Door adjustment systems are often complicated and the door adjustment processes are often time-consuming operational steps when assembling the vehicle. There is thus a need for an improved way of adjusting the vehicle doors relative to the vehicle body structure for a fast and efficient vehicle assembly process.

SUMMARY

An object of the present disclosure is to provide a door tilting system for a slidable vehicle door, a vehicle comprising at least one door tilting system, and a method for adjusting a door tilting system for a slidable vehicle door where the previously mentioned problems are avoided. This object is at least partly achieved by the features of the independent claims. The dependent claims contain further developments of the door tilting system for a slidable vehicle door and the method for adjusting a door tilting system for a slidable vehicle door.

The disclosure concerns a door tilting system for a slidable vehicle door, where the door tilting system is forming part of a pivoting joint between the vehicle door and a movable arm structure connecting the vehicle door to a vehicle body structure. The door tilting system comprises an inner socket and an outer socket, where the inner socket is arranged inside the outer socket and rotatably arranged relative to the outer socket. The inner socket comprises a receiving opening configured for receiving a fastening device, where the receiving opening has an elongated configuration and is extending in a first direction along a first axis through the inner socket. The door tilting system is configured for changing the first direction of the receiving opening relative to the outer socket upon rotational displacement of the inner socket relative to the outer socket.

Advantages with these features are that the door tilting system is enabling a simple and efficient way to adjust the vehicle door by changing the first direction of the receiving opening relative to the outer socket upon rotational displacement of the inner socket relative to the outer socket. The inner socket is thus rotated relative to the outer socket for achieving a correct door position, and by the rotational displacement a tilt angle of the fastening device is adjusted, which in turn is affecting the door position relative to a vehicle body structure to which the vehicle door is movably attached. A correct door position is important for a correct latching position of the vehicle door to the vehicle body structure, and for achieving a sealed connection between the vehicle door and the vehicle body structure, preventing noise, dust, and other contaminants, from entering the interior compartment. The simple adjustment through the rotational displacement between the inner socket and the outer socket is further essential for an aesthetically correct positioning of the vehicle door relative to the vehicle body structure. The simple door adjustment operation is enabling a fast and efficient vehicle assembly process. The slidable vehicle door is defined as any type of vehicle door that is connected to the vehicle body structure via one or more arm structures, where the one or more arm structures are pivoting relative to the vehicle door via pivoting joints allowing a longitudinal displacement of the vehicle door relative to the vehicle body structure, or allowing a combination of longitudinal and lateral displacement of the vehicle door relative to the vehicle body structure.

According to an embodiment, the inner socket comprises an outer surface and the outer socket comprises an inner surface. The outer surface of the inner socket is arranged in connection to the inner surface of the outer socket, where upon rotational displacement of the inner socket relative to the outer socket, the outer surface of the inner socket is configured to move relative to the inner surface of the outer socket. With this configuration, an efficient and compact construction of the door tilting system is achieved, where the inner socket is arranged inside the outer socket and rotatably arranged relative to the outer socket for a simple tilt adjustment operation.

According to an embodiment, the inner surface of the outer socket is forming an inner opening configured for receiving the inner socket. The inner opening is forming a channel-like structure in the outer socket that is configured for receiving the inner socket. The outer surface of the inner socket is arranged in connection to the inner surface of the outer socket, and upon rotational displacement of the inner socket relative to the outer socket, the inner socket is rotating within the inner opening of the outer socket. The inner opening suitably has a circular cross-sectional shape, allowing a rotational movement of the inner socket relative to the outer socket.

According to an embodiment, the inner opening is extending through the outer socket. In this way, the inner opening is forming a channel-like or tube-like structure in the outer socket that is configured for receiving the inner socket. The inner opening suitably has a circular cross-sectional shape for allowing the rotational movement of the inner socket relative to the outer socket.

According to an embodiment, the outer surface of the inner socket is arranged as a cylindrical surface, and the inner surface of the outer socket is arranged as a cylindrical surface. The cylindrical surfaces are allowing an efficient rotational displacement of the inner socket relative to the outer socket.

According to an embodiment, the outer surface of the inner socket is extending in a second direction, where the second direction is different from the first direction. This extension in the second direction is enabling the tilt adjustment operation.

According to an embodiment, the outer socket is connected to an outer end of the movable arm structure. The outer socket may be attached to or form an integrated structural part of the arm structure. The outer socket could for example be welded to the outer end of the arm structure for a strong and secure connection, or attached to the outer end of the arm structure with other suitable attachment means.

According to an embodiment, the door tilting system further comprises a first bracket and a second bracket attached to the vehicle door. The outer socket and the inner socket are arranged between the first bracket and the second bracket. In this way, the outer socket and the inner socket are each extending between the first bracket and the second bracket. This design is enabling a compact construction of the door tilting system, where the brackets and the sockets are determining the tilt position of the vehicle door.

According to an embodiment, the first bracket comprises a first fastening opening and the second bracket comprises a second fastening opening. In an assembled state of the door tilting system, the fastening device is extending through the first fastening opening, the receiving opening, and the second fastening opening. This construction is enabling a firm connection between the components involved, and the second fastening opening may for example be threaded for engaging threads arranged on the fastening device for a secure connection between the vehicle door and the arm structure, via the brackets and the sockets.

According to an embodiment, a slot is arranged in a side wall structure of the outer socket. The inner socket comprises a locking member extending from the inner socket through the slot to an outer side of the outer socket. The locking member is configured for releasably attaching the inner socket to the outer socket. The slot may have an elongated configuration and is extending through the side wall structure of the outer socket, forming an opening that is giving access to the inner socket from the outside surface of the outer socket. The locking member is allowed to move along the slot upon rotational displacement of the inner socket relative to the outer socket.

According to an embodiment, the locking member is in an unlocked state unlocking the inner socket from the outer socket, allowing rotational displacement of the inner socket relative to the outer socket. The locking member is in a locked state locking the inner socket to the outer socket through frictional engagement between at least the locking member and the outer socket, preventing rotational displacement of the inner socket relative to the outer socket. The locking member is allowed to move along the slot in the unlocked state upon rotational displacement of the inner socket relative to the outer socket, and when the inner socket has reached a desired position, the locking member is arranged in the locked state for preventing rotational displacement of the inner socket relative to the outer socket. The locking member may extend from the inner socket through the slot to the outside of the outer socket. The locking and unlocking operations are in this way efficiently enabled from outside the outer socket.

According to an embodiment, the inner socket comprises a threaded opening, and the locking member is arranged as a threaded screw configured for being in engagement with the threaded opening. In the locked state, the locking member is in contact with the outer socket. The locking member is with this configuration arranged as a screw that is extending from the inner socket through the slot to the outside of the outer socket. The locking member is threaded into the inner socket for enabling unlocking of the inner socket from the outer socket and locking of the inner socket to the outer socket.

The disclosure further concerns a vehicle comprising at least one door tilting system for a slidable vehicle door, as described above.

The disclosure further concerns a method for adjusting a door tilting system for a slidable vehicle door, where the door tilting system is forming part of a pivoting joint between the vehicle door and a movable arm structure connecting the vehicle door to a vehicle body structure. The door tilting system comprises an inner socket and an outer socket, where the inner socket is arranged inside the outer socket and rotatably arranged relative to the outer socket. The inner socket comprises a receiving opening configured for receiving a fastening device, where the receiving opening has an elongated configuration and is extending in a first direction along a first axis through the inner socket. The method comprises the steps: rotatably displacing the inner socket relative to the outer socket, wherein the rotational displacement of the inner socket relative to the outer socket is changing the first direction of the receiving opening relative to the outer socket.

Advantages with these features are that the method for adjusting the door tilting system door tilting is providing an efficient way to adjust the vehicle door through simple operational steps by changing the first direction of the receiving opening relative to the outer socket upon rotational displacement of the inner socket relative to the outer socket. The inner socket is according to the method being rotated relative to the outer socket for achieving a correct door position, and by the rotational displacement a tilt angle of the fastening device is adjusted, which in turn is affecting the door position relative to a vehicle body structure to which the vehicle door is movably attached. A correct door position is important for a correct latching position of the vehicle door to the vehicle body structure, and for achieving a sealed connection between the vehicle door and the vehicle body structure, preventing noise, dust, and other contaminants, from entering the interior compartment. The simple adjustment through the rotational displacement between the inner socket and the outer socket is essential for an aesthetically correct positioning of the vehicle door relative to the vehicle body structure. The simple door adjustment operation is further enabling a fast and efficient vehicle assembly process.

According to an embodiment, a slot is arranged in a side wall structure of the outer socket. The inner socket comprises a locking member extending from the inner socket through the slot to an outer side of the outer socket. The locking member is configured for releasably attaching the inner socket to the outer socket. The method further comprises the steps: unlocking the inner socket from the outer socket by the locking member to an unlocked state for allowing rotational displacement of the inner socket relative to the outer socket; displacing the inner socket relative to the outer socket to a desired position; and locking the inner socket to the outer socket by the locking member to a locked state for preventing rotational displacement of the inner socket relative to the outer socket. The slot may have an elongated configuration and is extending through the side wall structure of the outer socket, forming an opening that is giving access to the inner socket from the outside surface of the outer socket. The locking member is allowed to move along the slot in the unlocked state upon rotational displacement of the inner socket relative to the outer socket, and when the inner socket has reached a desired position, the locking member is arranged in the locked state for preventing rotational displacement of the inner socket relative to the outer socket. The locking member may be arranged as a screw that is extending from the inner socket through the slot to the outside of the outer socket. The locking member is suitably threaded into the inner socket for enabling unlocking of the inner socket from the outer socket and locking of the inner socket to the outer socket. The locking and unlocking operations are with this configuration efficiently enabled from outside the outer socket.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
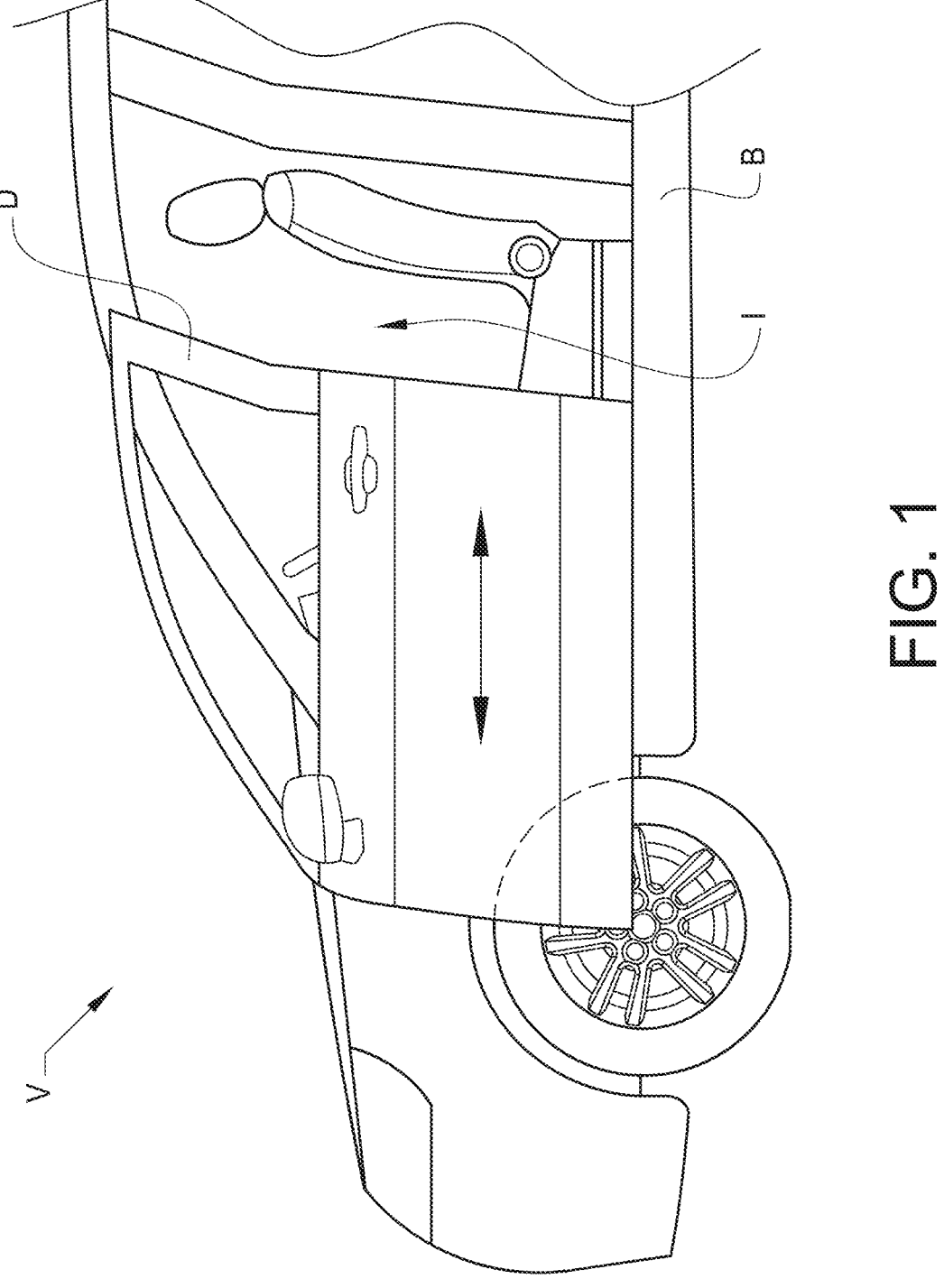
FIG. 1 shows schematically, in a side view, a vehicle with a slidable vehicle door, according to the disclosure.
Figure 2:
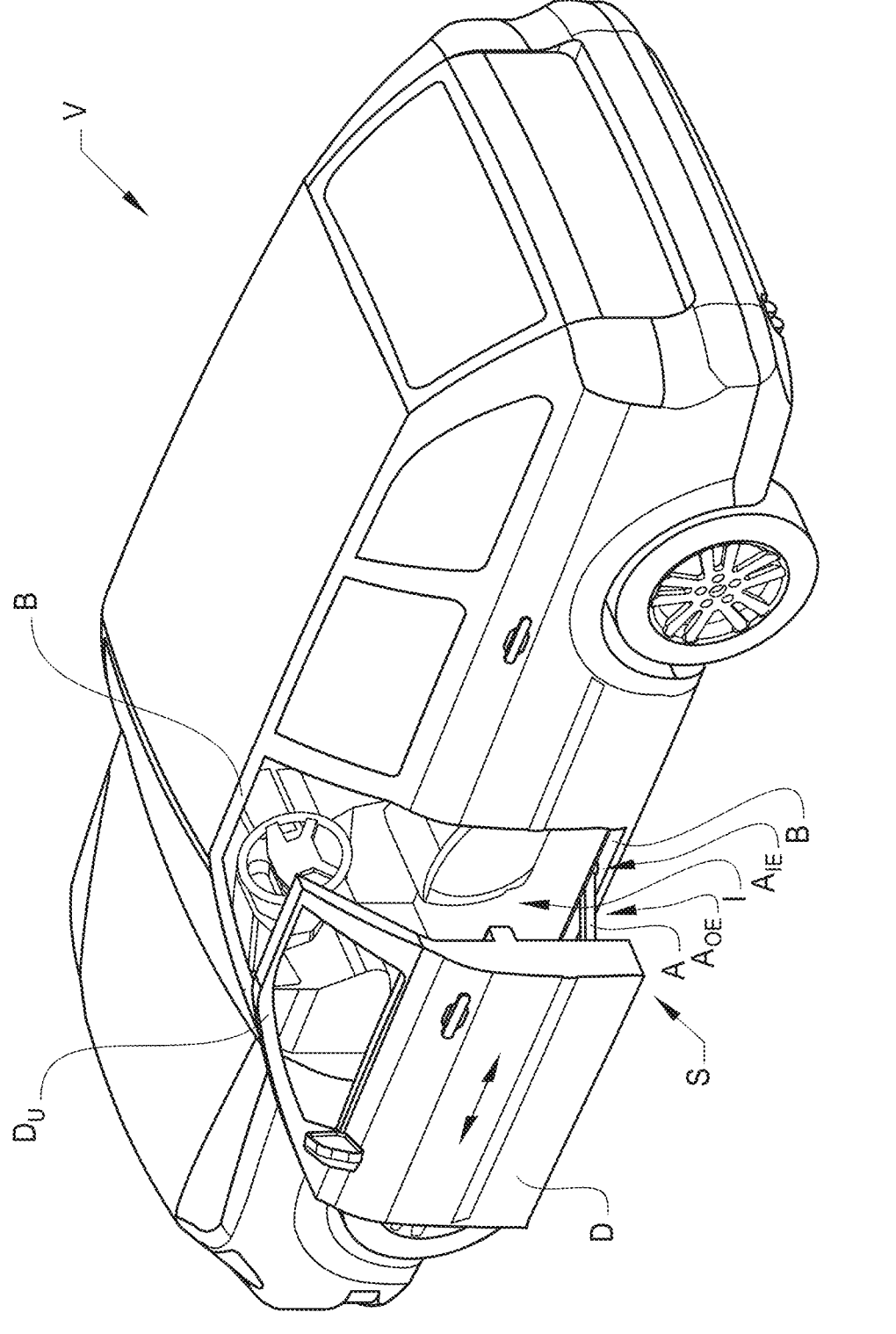
FIG. 2 shows schematically, in a perspective view from above, the vehicle with the slidable vehicle door, according to the disclosure.

FIGS. 1-2 schematically show a vehicle V with a slidable vehicle door D. The vehicle door D is connected to a vehicle body structure B and movably arranged between a closed door position and an open door position, as indicated with the double arrow in FIG. 1. In the closed door position, access to an interior compartment I of the vehicle V via a door opening in the vehicle body structure B is prevented, and in the open door position, access to the interior compartment I of the vehicle V via the door opening in the vehicle body structure B is enabled. In the figures, the vehicle door D is illustrated in an open door position for illustrative purposes.

Figure 3:
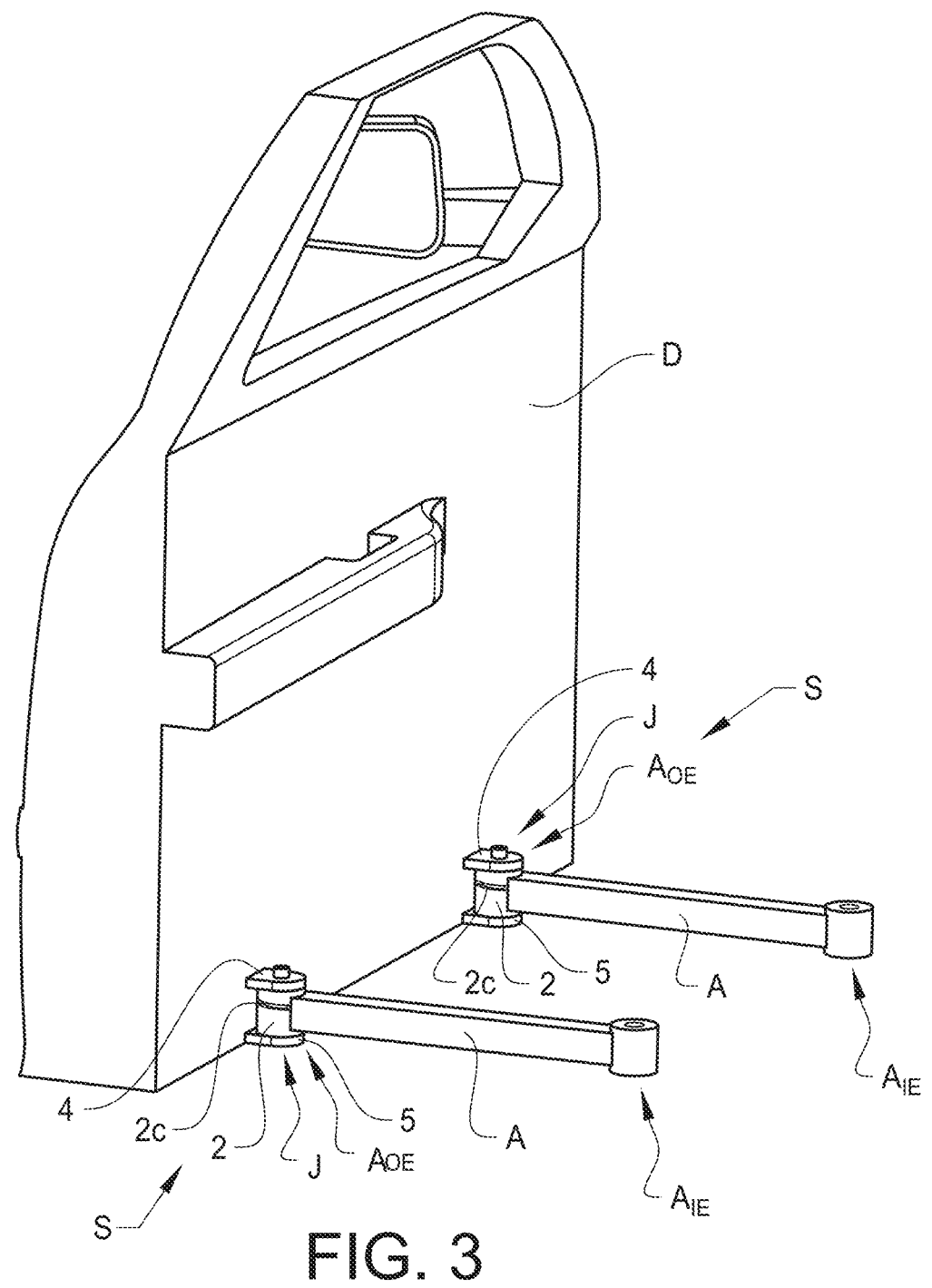
FIG. 3 shows schematically, in a perspective view, the vehicle door with a door tilting system, according to the disclosure.

In FIGS. 3 and 4A-4C, a door tilting system S for the slidable vehicle door D is schematically illustrated. The door tilting system S is forming part of a pivoting joint J between the vehicle door D and a movable arm structure A. The pivoting joint J is allowing the arm structure to pivot relative to the vehicle door D. The arm structure A is connecting the vehicle door D to the vehicle body structure B of the vehicle V. As shown in FIG. 3, the vehicle door D is connected to the vehicle body structure B via two arm structures A arranged at the lower part of the vehicle door D, where each arm structure A is rotatably connected to the vehicle door D via a pivoting joint J. In this way, each arm structure A is allowed to rotate relative to the vehicle door D for an efficient displacement of the vehicle door D during door opening and closing operations. The arm structures A may have any suitable shape or configuration, and in the illustrated embodiment, the arm structures A are rotating in a horizontal plane, or essentially horizontal plane, when opening and closing the vehicle door D.

It should be understood that the term slidable vehicle door for all embodiments is defined as any type of vehicle door that is connected to a vehicle body structure via one or more arm structures, where the one or more arm structures are pivoting relative to the vehicle door via pivoting joints allowing a longitudinal displacement of the vehicle door relative to the vehicle body structure, or allowing a combination of longitudinal and lateral displacement of the vehicle door relative to the vehicle body structure.

As described above, the vehicle door D is connected to the vehicle body structure B, as understood from FIG. 2, and in the illustrated embodiment two arm structures A are arranged at the lower part of the vehicle door D, as shown in FIG. 3. The door tilting system S may be arranged in each pivoting joint J between the vehicle door D and respective movable arm structure A. Each arm structure A comprises an inner end $A_{IE}$ arranged in connection to the vehicle body structure B and an outer end $A_{OE}$ arranged in connection to the vehicle door D. The inner ends $A_{IE}$ of the arm structures A may suitable be rotatably arranged relative to the vehicle body structure B and connected to track structures or similar arrangements for longitudinal displacement in a lower sill area of the vehicle body structure B at the door opening, as indicated in FIG. 2. In the illustrated embodiment, each arm structure A is thus arranged as a lower arm for holding and displacing the vehicle door D relative to the vehicle body structure B, and each arm structure A is therefore suitably connected to a lower part of the vehicle body structure B. The vehicle door D may further have an upper arm structure for enabling the movable connection between the vehicle door D and the vehicle body structure B.

It should be understood that in other embodiments, one or more arm structures A could connect the vehicle door D to any suitable part of the vehicle body structure B. The vehicle door D may in other embodiments be arranged with any suitable number of arm structures A arranged at the lower part and/or the upper part of the vehicle door D, and one or more of the joints J between the arm structures A and the vehicle door D may be arranged with the door tilting system S.

Embodiments of the door tilting system S are shown in FIGS. 4A-4C, 5A-5D, and 6A-6D. As shown in the figures, the door tilting system S comprises an inner socket 1 and an outer socket 2. The inner socket 1 is arranged inside the outer socket 2 and rotatably arranged relative to the outer socket 2, as illustrated with the double arrow in FIGS. 5A and 6A. The inner socket 1 comprises a receiving opening 3, and the receiving opening 3 is configured for receiving a fastening device 3a, such as a screw, a bolt, locking pin, or other suitable fastening element, for connecting the arm structure A to the vehicle door D. The receiving opening 3 has an elongated configuration and is extending in a first direction D1 along a first axis A1 through the inner socket 1. The receiving opening 3 is thus extending through the inner socket 1, and in the illustrated embodiment the receiving opening 3 has a tube-like or channel-like shape with dimensions suitable for receiving the fastening device 3a without too much play between the receiving opening 3 and the fastening device 3a, as understood from FIGS. 5C-5D and 6C-6D.

The door tilting system S further comprises a first bracket 4 and a second bracket 5 attached to the vehicle door D, as shown in FIGS. 4A-4C, 5C-5D, and 6C-6D. The outer socket 2 and the inner socket 1 are arranged between the first bracket 4 and the second bracket 5. In this way, the outer socket 2 and the inner socket 1 are each extending between the first bracket 4 and the second bracket 5, as understood from FIGS. 5C-5D and 6C-6D. The first bracket 4 comprises a first fastening opening 4a and the second bracket 5 comprises a second fastening opening 5a, and in an assembled state SA of the door tilting system S, as shown in FIGS. 4A-4C, 5C-5D, and 6C-6D, the fastening device 3a is extending through the first fastening opening 4a, the receiving opening 3, and the second fastening opening 5a. Upon opening and closing of the vehicle door D, the arm structure A is rotating around the fastening device 3a relative to the vehicle door D. In the illustrated embodiment, the second fastening opening 5a may for example be threaded for engaging threads arranged on the fastening device 3a for a firm connection between the vehicle door D and the arm structure A, via the brackets and the sockets. The outer socket 2 is connected to the outer end $A_{OE}$ of the movable arm structure A, and suitably the outer socket 2 is forming an integrated structural part of the arm structure A. The outer socket 2 may for example be welded to the outer end $A_{OE}$ of the arm structure A for a strong and secure connection, or attached to the to the outer end $A_{OE}$ of the arm structure with other suitable attachment means.

The inner socket 1 is arranged as a separate structural component inside the outer socket 2, and the inner socket 1 is rotatably arranged relative to the outer socket 2. The inner socket 1 comprises an outer surface 1a and the outer socket 2 comprises an inner surface 2a. The inner surface 2a of the outer socket 2 is in this way forming an inner opening 2b that is configured for receiving the inner socket 1. The inner opening 2b is extending through the outer socket 2, and in this way, the inner opening 2b is forming a channel-like or tube-like structure in the outer socket 2 that is configured for receiving the inner socket 1. The inner opening 2b suitably has a circular cross-sectional shape for allowing a rotational movement of the inner socket 1 relative to the outer socket 2 around a rotational second axis A2 extending in a second direction D2. In the illustrated embodiment, the inner opening has a circular cross-sectional shape with a constant diameter along its extension. However, the inner opening may in other embodiments have any suitable shape allowing rotational displacement of the inner socket relative to the outer socket, depending on the design of the door tilting system, such as for example conical or conical-like configurations where the inner opening has a circular cross-sectional shape.

The outer surface 1a of the inner socket 1 is arranged in connection to the inner surface 2a of the outer socket 2, as shown in FIGS. 5C-5D and 6C-6D, and upon rotational displacement of the inner socket 1 relative to the outer socket 2 the outer surface 1a of the inner socket 1 is moving relative to the inner surface 2a of the outer socket 2.

An elongated slot 2c is arranged in a side wall structure 2d of the outer socket 2, as shown in FIGS. 4A-4C, 5A-5B, and 6A-6B. The slot 2c is extending through the side wall structure 2d of the outer socket 2, from the inner surface 2a to an outer surface 2e of the outer socket 2, forming an opening that is giving access to the inner socket 1 from the outer surface 2e of the outer socket 2.

Figure 4A:
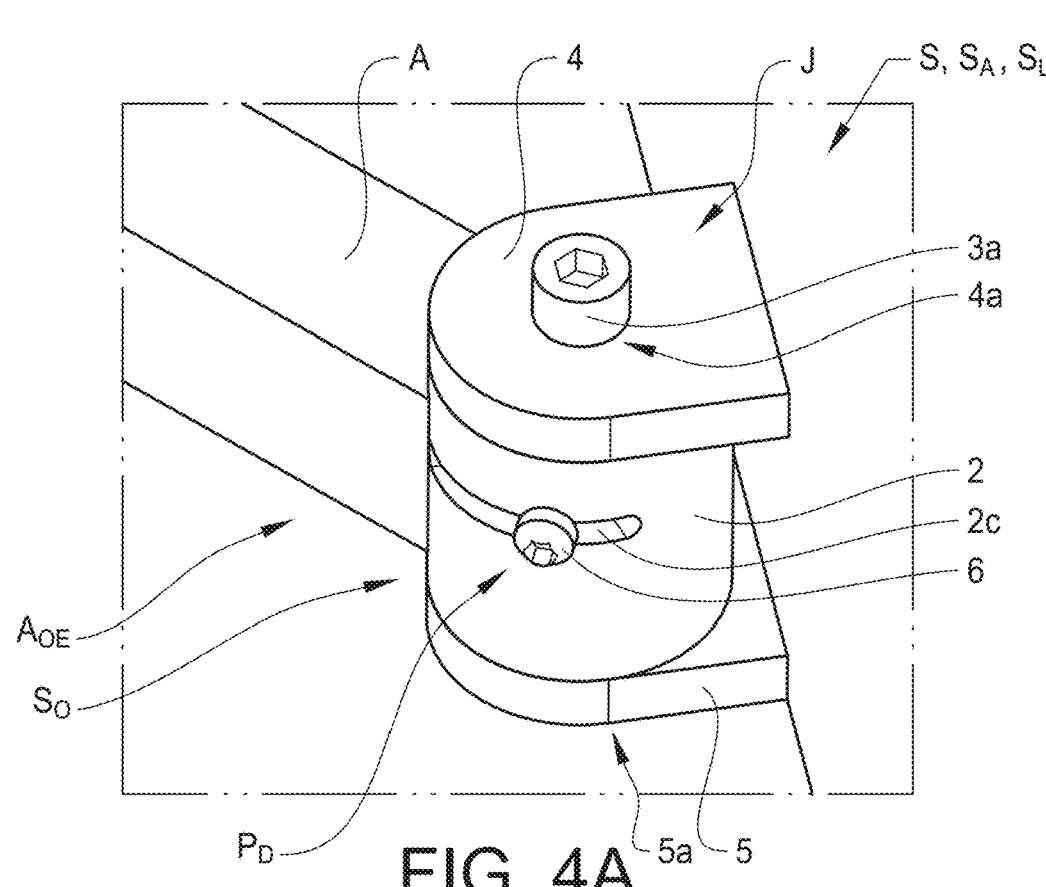
FIG. 4A-4C show schematically, in perspective views, the door tilting system, according to the disclosure.
Figure 4B:
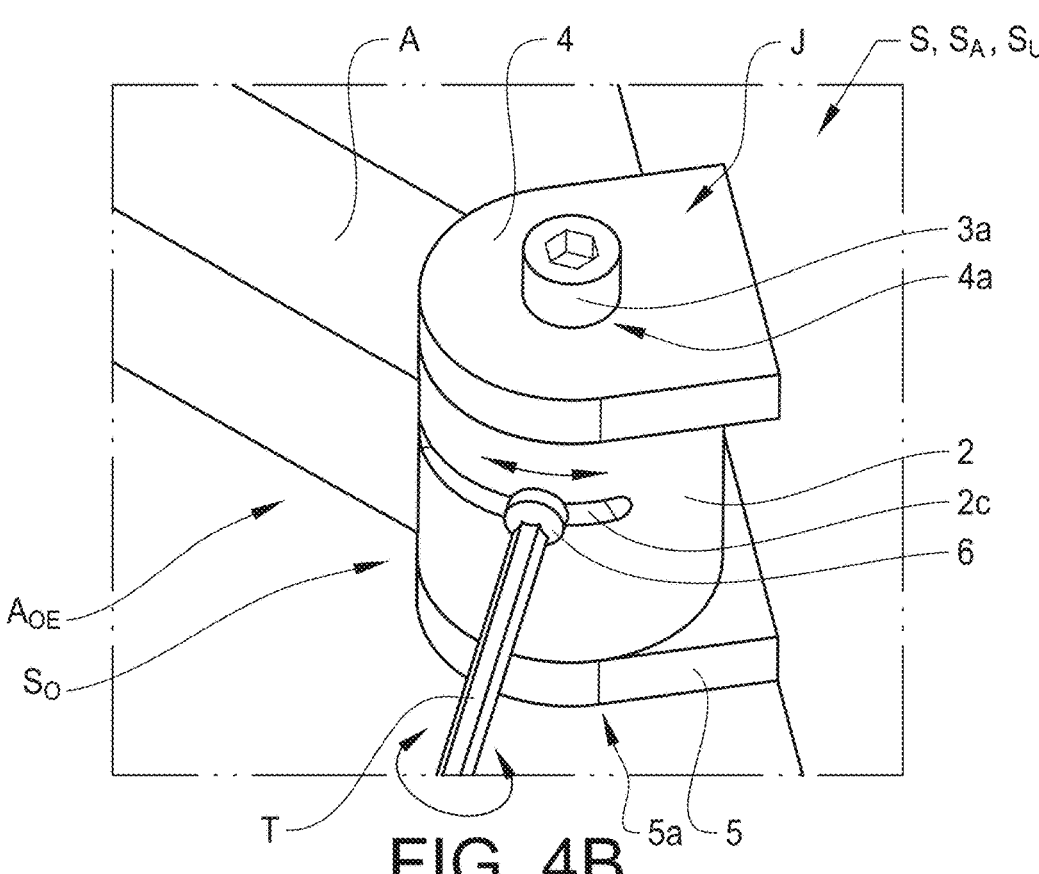
Figure 4C:
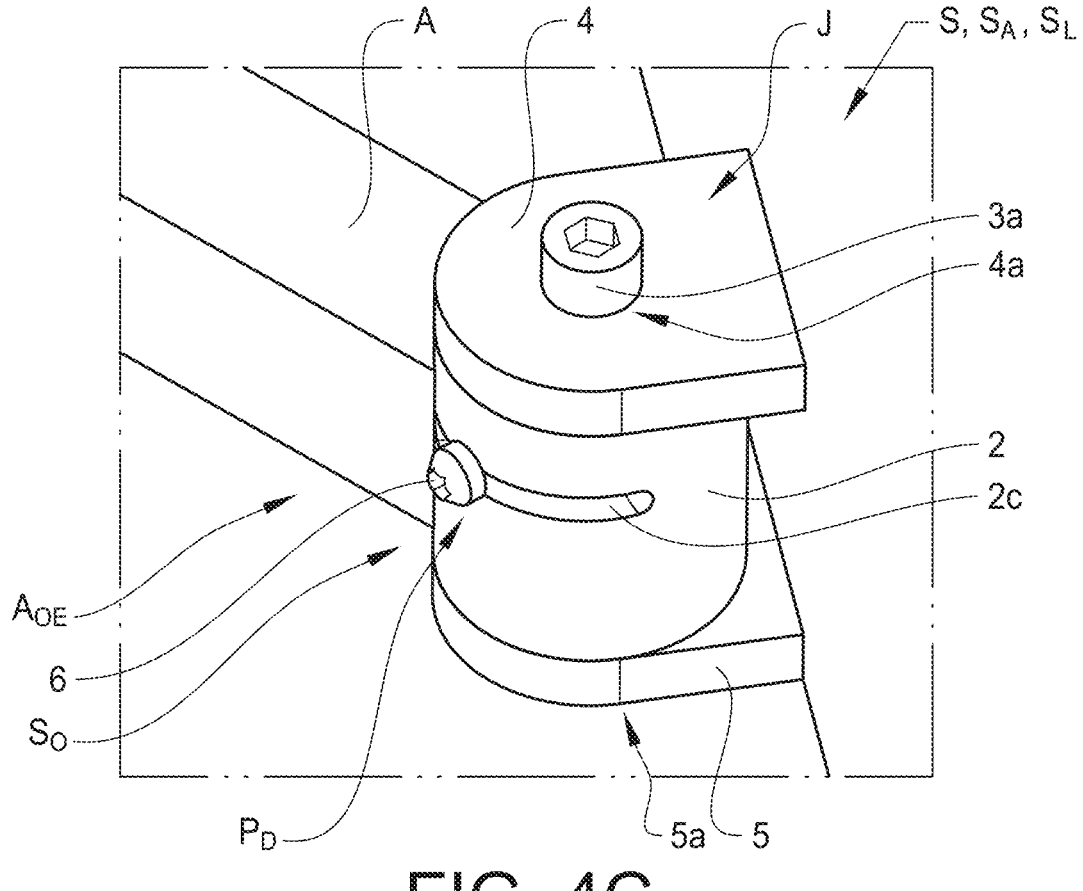
Figures 5A, 5B:
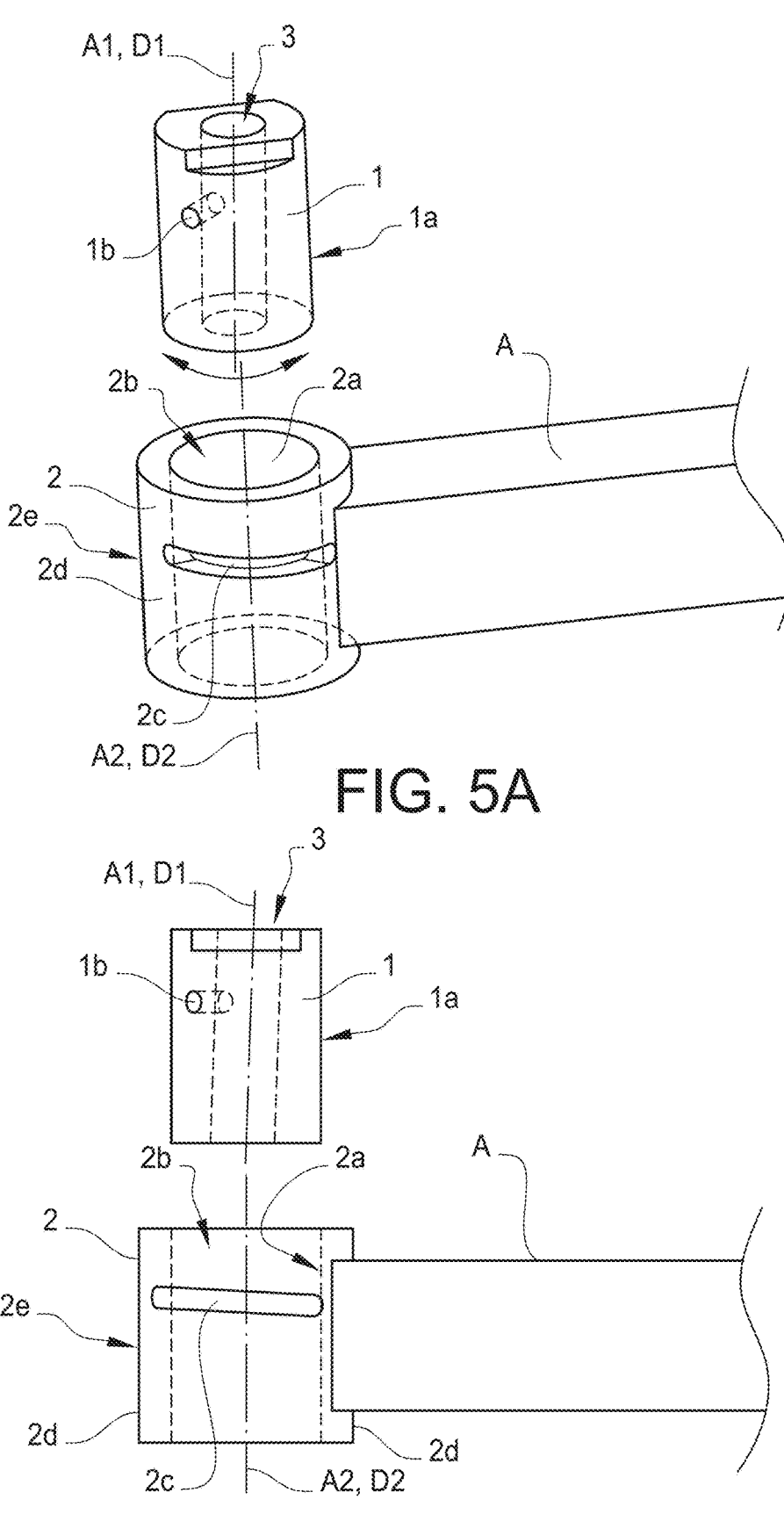
FIG. 5A-5D show schematically, in perspective views, an embodiment of the door tilting system, according to the disclosure.
Figure 5C:
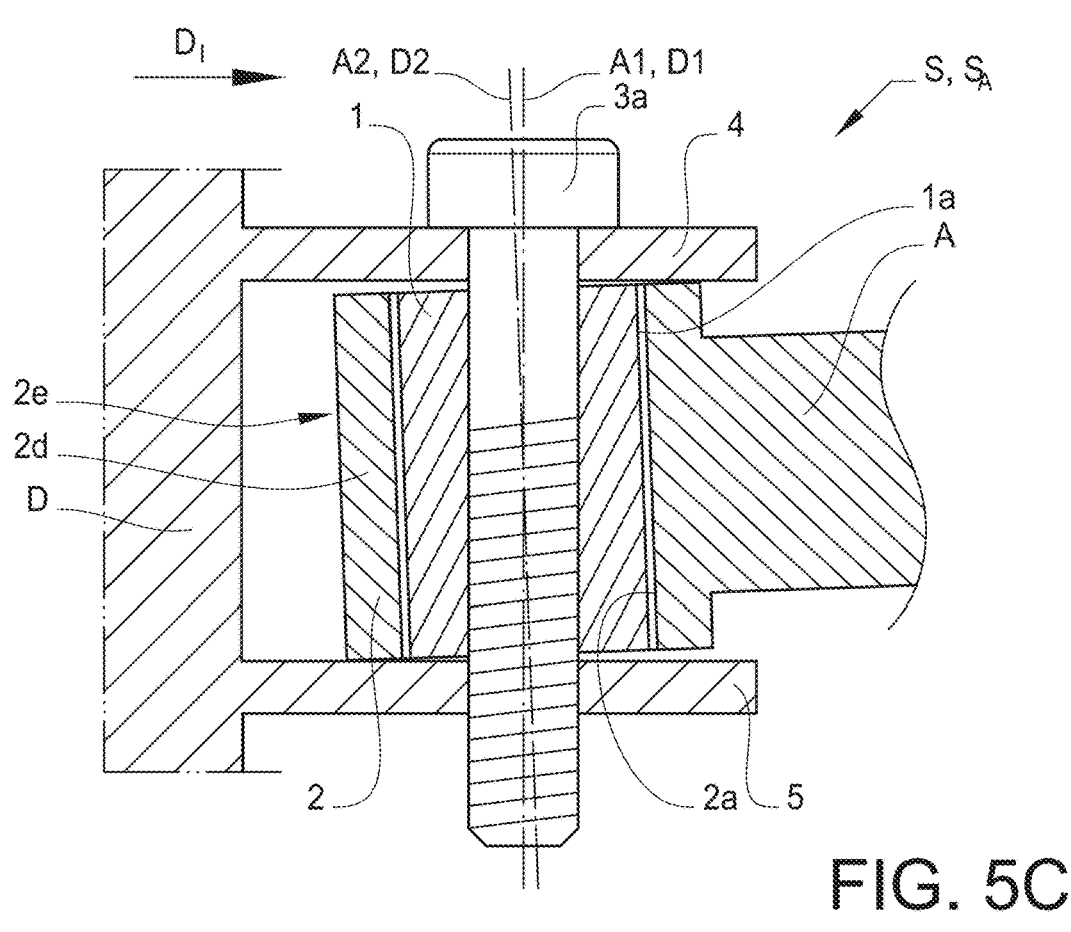
Figure 5D:
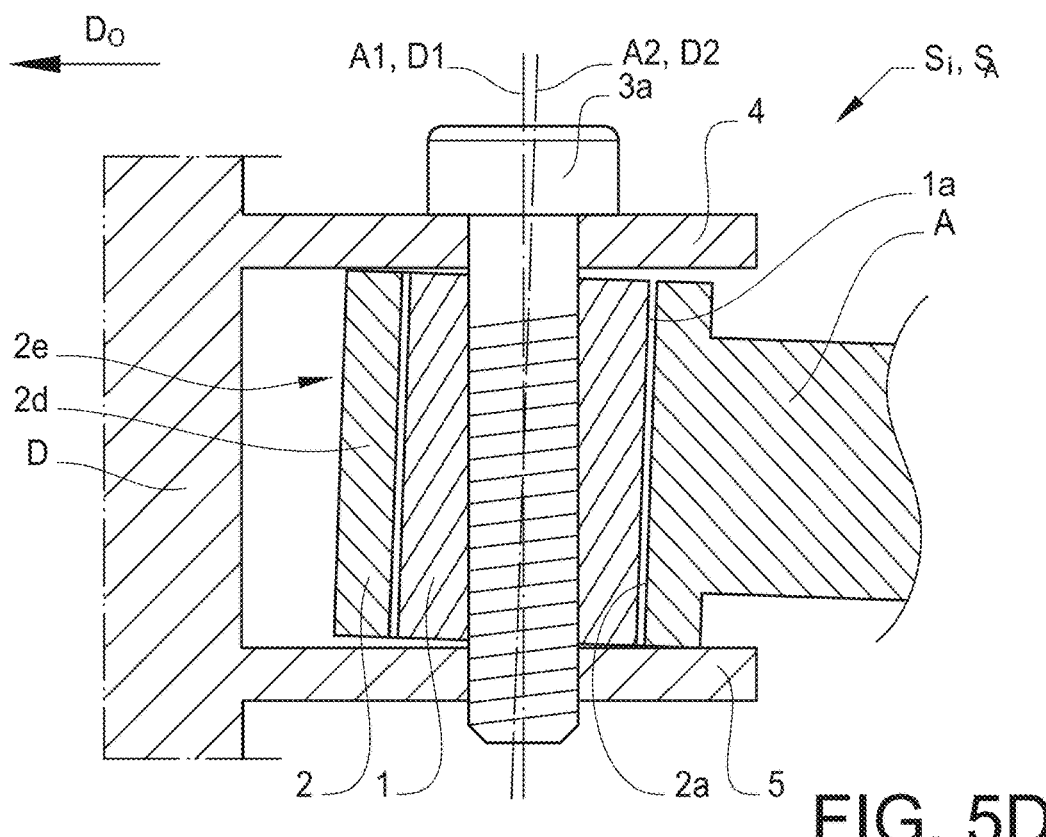
Figures 6A, 6B:
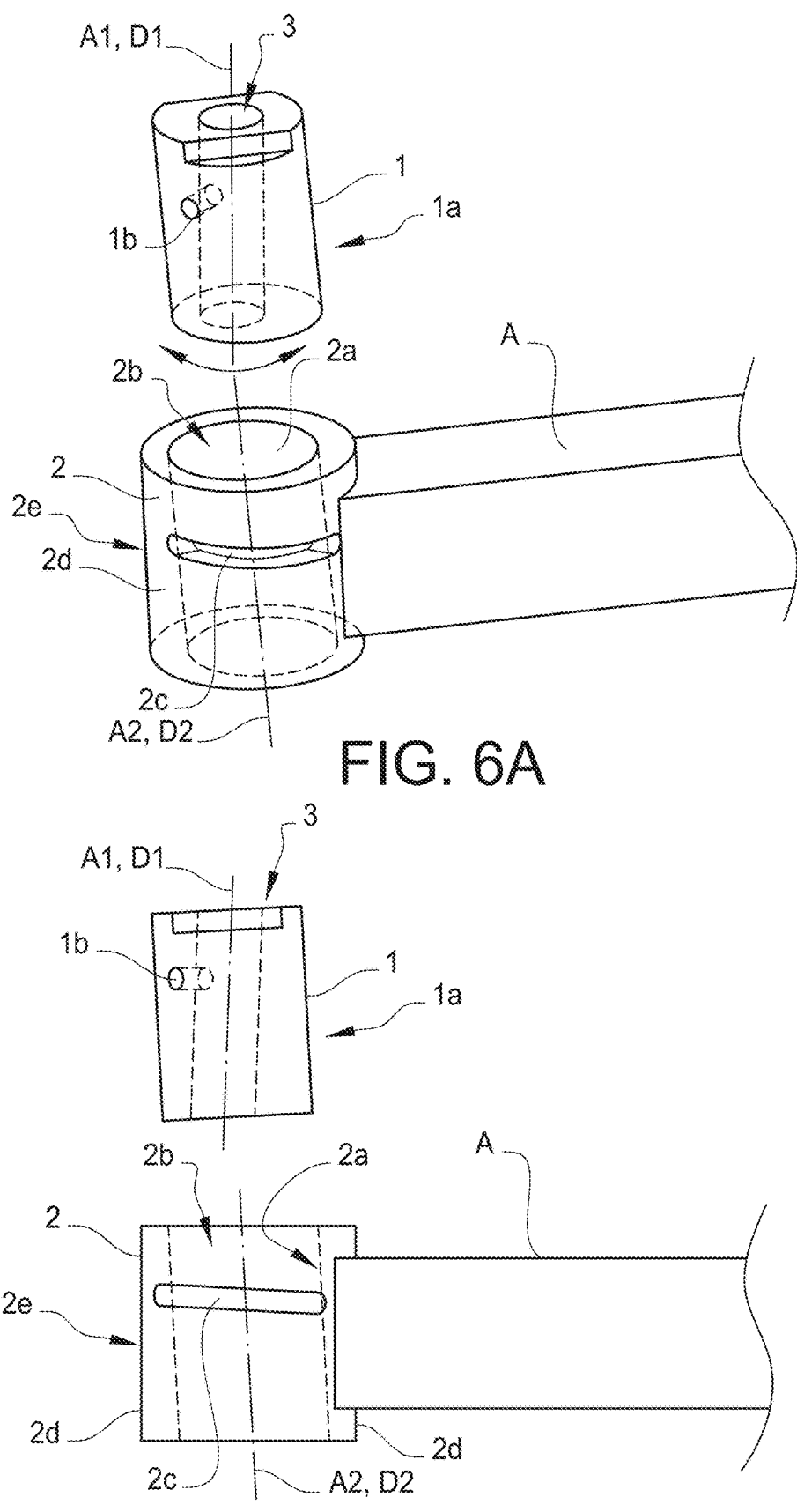
FIG. 6A-6D show schematically, in perspective views, an alternative embodiment of the door tilting system, according to the disclosure.
Figure 6C:
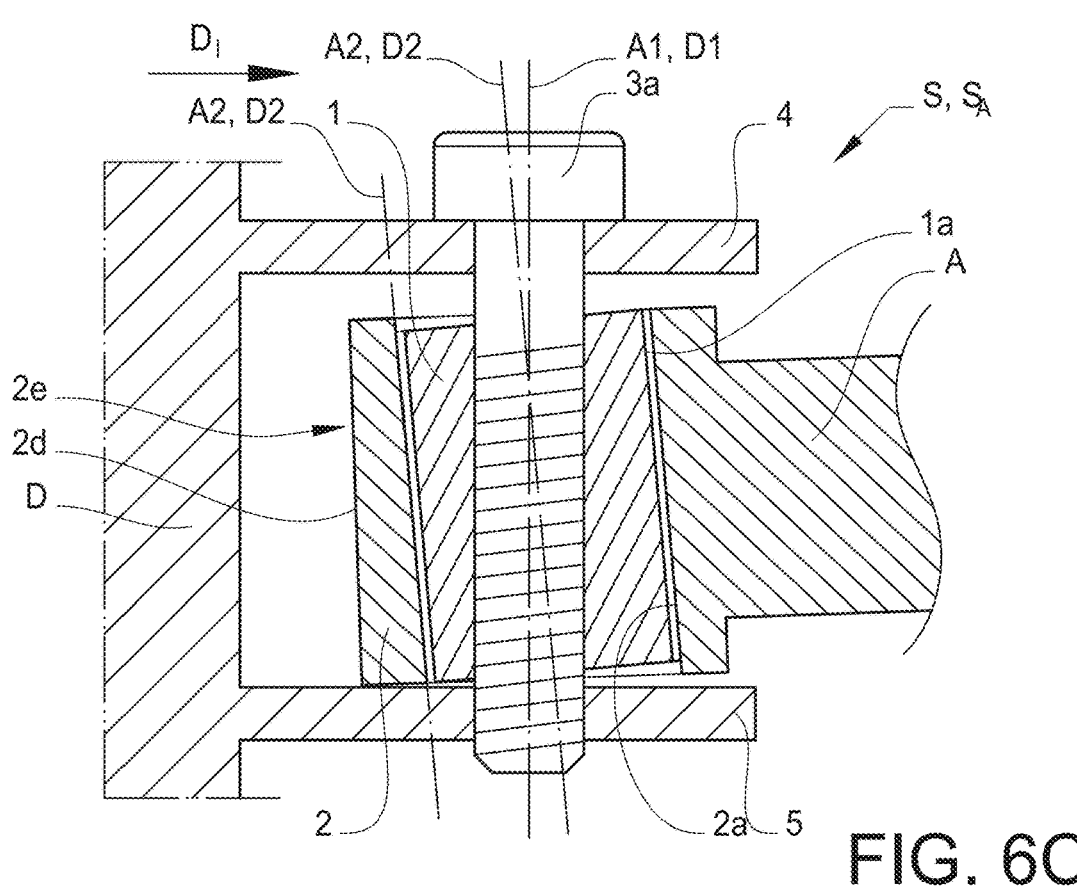
Figure 6D:
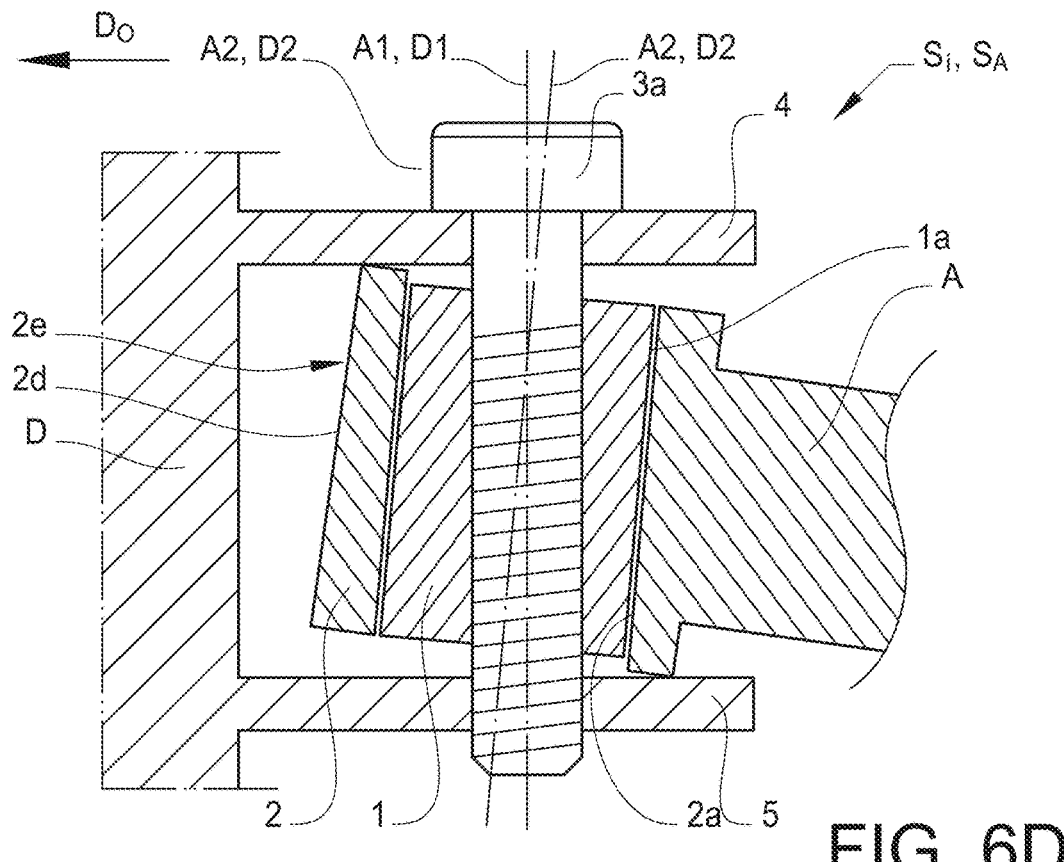

As understood from FIGS. 4A-4C, the inner socket 1 comprises a locking member 6 extending from the inner socket 1 through the slot 2c to an outer side $S_O$ of the outer socket 2, wherein the locking member 6 is configured for releasably attaching the inner socket 1 to the outer socket 2. The locking member 6 is in an unlocked state $S_U$ unlocking the inner socket 1 from the outer socket 2, allowing rotational displacement of the inner socket 1 relative to the outer socket 2. The locking member 6 is in a locked state $S_L$, locking the inner socket 1 to the outer socket 2 through frictional engagement between at least the locking member 6 and the outer socket 2, and through the frictional engagement rotational displacement of the inner socket 1 relative to the outer socket 2 is prevented. The inner socket 1 comprises a threaded opening 1b, as shown in FIGS. 5A-5B and 6A-6B, and the locking member 6 is arranged as a threaded screw configured for being in engagement with the threaded opening 1b. In the locked state $S_L$, the locking member 6 is in contact with the outer socket 2 for establishing the frictional locking engagement that is preventing relative movement between the inner socket 1 and the outer socket 2. In the locked state $S_L$, the inner socket 1 and the outer socket 2 are thus rotating as a common structure together with the arm structure A around the fastening device 3a upon displacement of the vehicle door D. The slot 2c has in the illustrated embodiment an elongated configuration and is extending through the side wall structure 2d of the outer socket, and in this way the slot 2c is forming an opening that is giving access to the inner socket from outside the outer socket 2. The locking member 6 is allowed to move along the slot in the unlocked state St upon rotational displacement of the inner socket 1 relative to the outer socket 2. When the inner socket 1 has reached a desired position relative to the outer socket 2, the locking member 6 is arranged in the locked state $S_L$, for preventing rotational displacement of the inner socket 1 relative to the outer socket 2. The locking member 6 may be arranged as a screw that is extending from the inner socket 1 through the slot 2c to the outside of the outer socket 2. The locking member 6 is threaded into the threaded opening 1b of the inner socket 1 for enabling unlocking of the inner socket 1 from the outer socket 2 and locking of the inner socket 1 to the outer socket 2. The locking and unlocking operations are with this configuration efficiently enabled from outside the outer socket 2 with a tool T that is rotating the locking member 6 between the locked and unlocked states, as indicated in FIG. 4B.

As shown in FIGS. 5A-5D and 6A-6D, and 6A-6D, the receiving opening 3 has an elongated configuration and is extending in the first direction D1 along the first axis A1 through the inner socket 1. In the illustrated embodiments, the receiving opening 3 has an inclined extension through the inner socket 1. The outer surface 1a of the inner socket 1 is arranged as a cylindrical surface and the inner surface 2a of the outer socket 2 is arranged as a cylindrical surface, and upon rotational displacement of the inner socket 1 relative to the outer socket 2, the inner socket 1 is rotating around the second axis A2 extending in the second direction D2. The door tilting system S is through the inclined configuration of the receiving opening 3 relative to the second axis A2 enabling the change of the first direction D1 of the receiving opening 3 relative to the outer socket 2 upon rotational displacement of the inner socket 1 relative to the outer socket 2. The change of the first direction D1 of the receiving opening 3 relative to the outer socket 2 upon rotational displacement of the inner socket 1 is changing a tilt position between the vehicle door D and the arm structure A as understood from FIGS. 5C-5D and 6C-6D. The tilt position is defined as the angular relationship between the vehicle door D and the arm structure A, and is defined by the angular relationship between the first axis A1 and the second axis A2. In the tilt position illustrated in FIGS. 5C and 6C, the vehicle door D is tilted in an inwards direction D1 relative to the arm structure A, positioning an upper end D$_u$ of the vehicle door D closer to the vehicle body structure B in the closed door position. In the tilt position illustrated in FIGS. 5D and 6D, the vehicle door D is tilted in an outwards direction D$_o$ relative to the arm structure A, positioning the upper end D$_u$ of the vehicle door D farther from the vehicle body structure B in the closed door position.

The inner socket 1 is arranged to rotate relative to the outer socket 2 around the rotational second axis A2 extending in the second direction D2, and thus the inner socket 1 is upon rotational displacement relative to the outer socket 2 rotating about the rotational second axis A2. The door tilting system S has a configuration where the first direction D1 is different from the second direction D2, and thus the first axis A1 is non-parallel to the second axis A2. This difference in directions between the first axis A1 and the second axis A2 is enabling the change of the first direction D1 of the receiving opening 3 relative to the outer socket 2 upon rotational displacement of the inner socket 1 relative to the outer socket 2 around the second axis A2. In the illustrated embodiments in FIGS. 5A-5D and 6A-6D, where the outer surface 1*a* of the inner socket 1 is arranged as a cylindrical surface and the inner surface 2*a* of the outer socket 2 is arranged as a cylindrical surface, both the outer surface 1*a* of the inner socket 1 and the inner surface 2*a* of the outer socket 2 are thus extending in, or essentially in, the second direction D2, where the second direction D2 is different from the first direction D1. In the embodiment illustrated in FIGS. 5A-5D, the second direction D2 is extending with a straight configuration through the outer socket 2, and with this configuration the inner opening 2*b* thus has a straight extension through the outer socket 2, as understood from for example FIG. 5B. In the alternative embodiment in FIGS. 6A-6D, the second direction D2 is extending with an inclined configuration through the outer socket 2, and with this configuration the inner opening 2*b* thus has an inclined extension through the outer socket 2 for increased tilting possibilities, as understood from FIGS. 6A-6D. It should be understood that the inner opening 2*b* may be inclined in any suitable direction relative to the outer socket 2 and/or the arm structure A, depending on the design and construction of the door tilting system S.

In a further alternative non-illustrated embodiment, the receiving opening 3 may instead be arranged with a straight extension through the inner socket 1, and the inner opening 2*b* is arranged with an inclined extension through the outer socket 2.

To operate the door tilting system S, and adjust the tilt position between the vehicle door D and the arm structure A, the inner socket 1 is first unlocked from the outer socket 2 by arranging the locking member 6 into an unlocked state St. In the embodiment illustrated in FIG. 4B, the tool T is inserted into the locking member 6, and by unscrewing the locking member 6, the locking member 6 is displaced from the locked state S$_L$ to the unlocked state Su for allowing rotational displacement of the inner socket 1 relative to the outer socket 2. In the unlocked state S$_U$, the inner socket 1 can be rotatably displaced relative to the outer socket 2 into any suitable desired position P$_D$ enabling a correct tilt position, such as for example the positions illustrated in FIGS. 4A and 4C. When the inner socket 1 is rotatably displaced relative to the outer socket 2, the outer end of the locking member 6 is sliding within the slot 2*c*, and the rotational displacement of the inner socket 1 relative to the outer socket 2 is changing the first direction D1 of the receiving opening 3 relative to the outer socket 2. When the inner socket 1 has been displaced relative to the outer socket 2 to the desired position P$_D$, the inner socket 1 is locked to the outer socket 2 by arranging the locking member 6 into a locked state S$_L$ for preventing rotational displacement of the inner socket 1 relative to the outer socket 2. In the desired position P$_D$, the tool T is inserted into the locking member 6, and by screwing the locking member 6 into the inner socket 1, the locking member 6 is displaced from the unlocked state S$_U$ to the locked state S$_L$ for preventing rotational displacement of the inner socket 1 relative to the outer socket 2. The locking member 6 is in the locked state S$_L$ locking the inner socket 1 to the outer socket 2 through frictional engagement between at least the locking member 6 and the outer socket 2. Through the frictional engagement, rotational displacement of the inner socket 1 relative to the outer socket 2 is efficiently prevented.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Inner socket
1*a*: Outer surface
1*b*: Threaded opening
2: Outer socket
2*a*: Inner surface
2*b*: Inner opening
2*c*: Slot
2*d*: Side wall structure
2*e*: Outer surface
3: Receiving opening 3a: Fastening device
4: First bracket
4a: First fastening opening
5: Second bracket
5a: Second fastening opening
6: Locking member
A: Arm structure
$A_{IE}$: Inner end, Arm structure
$A_{OE}$: Outer end, Arm structure
A1: First axis
A2: Second axis
B: Vehicle body structure
D: Vehicle door
D1: First direction
D2: Second direction
$D_I$: Inwards direction
$D_O$: Outwards direction
$D_U$: Upper end
I: Interior compartment
J: Pivoting joint
$P_D$: Desired position
S: Door tilting system
$S_A$: Assembled state
$S_L$: Locked state
$S_O$: Outer side
$S_U$: Unlocked state
T: Tool
V: Vehicle

What is claimed is:

1. A door tilting system for a slidable vehicle door, wherein the door tilting system is forming part of a pivoting joint between the vehicle door and a movable arm structure connecting the vehicle door to a vehicle body structure, wherein the door tilting system comprises:

an inner socket and an outer socket, wherein the inner socket is arranged inside the outer socket and rotatably arranged relative to the outer socket, wherein the inner socket comprises a receiving opening configured for receiving a fastening device, wherein the movable arm structure is configured for rotating around the fastening device relative to the vehicle door, wherein the receiving opening has an elongated configuration and is extending in a first direction along a first axis through the inner socket, wherein the door tilting system is configured for changing the first direction of the receiving opening relative to the outer socket upon rotational displacement of the inner socket relative to the outer socket, wherein the door tilting system further comprises:

a slot arranged in a side wall structure of the outer socket, wherein the inner socket comprises a locking member extending from the inner socket through the slot to an outer side of the outer socket, wherein the locking member is configured for releasably attaching the inner socket to the outer socket, wherein the inner socket comprises an outer surface and the outer socket comprises an inner surface, wherein the outer surface of the inner socket is arranged in connection to the inner surface of the outer socket, wherein upon rotational displacement of the inner socket relative to the outer socket the outer surface of the inner socket is configured to move relative to the inner surface of the outer socket, wherein the outer surface of the inner socket extends in a second direction, wherein the second direction is different from the first direction.

2. The door tilting system according to claim 1, wherein the inner surface of the outer socket is forming an inner opening configured for receiving the inner socket.

3. The door tilting system according to claim 2, wherein the inner opening is extending through the outer socket.

4. The door tilting system according to claim 1, wherein the outer surface of the inner socket is arranged as a cylindrical surface, and wherein the inner surface of the outer socket is arranged as a cylindrical surface.

5. The door tilting system according to claim 1, wherein the outer socket is connected to an outer end of the movable arm structure.

6. The door tilting system according to claim 1, wherein the door tilting system further comprises a first bracket and a second bracket attached to the vehicle door, wherein the outer socket and the inner socket are arranged between the first bracket and the second bracket.

7. The door tilting system according to claim 6, wherein the first bracket comprises a first fastening opening and the second bracket comprises a second fastening opening, wherein in an assembled state of the door tilting system the fastening device is extending through the first fastening opening, the receiving opening, and the second fastening opening.

8. The door tilting system according to claim 1, wherein the locking member in an unlocked state is unlocking the inner socket from the outer socket, allowing rotational displacement of the inner socket relative to the outer socket; and wherein the locking member in a locked state is locking the inner socket to the outer socket through frictional engagement between at least the locking member and the outer socket, preventing rotational displacement of the inner socket relative to the outer socket.

9. The door tilting system according to claim 1, wherein the inner socket comprises a threaded opening, wherein the locking member is arranged as a threaded screw configured for being in engagement with the threaded opening, wherein in the locked state the locking member is in contact with the outer socket.

10. A vehicle comprising at least one door tilting system for a slidable vehicle door according to claim 1.

11. A method for adjusting a door tilting system for a slidable vehicle door, wherein the door tilting system is forming part of a pivoting joint between the vehicle door and a movable arm structure connecting the vehicle door to a vehicle body structure, wherein the door tilting system includes:

an inner socket and an outer socket, wherein the inner socket is arranged inside the outer socket and rotatably arranged relative to the outer socket, wherein the inner socket has a receiving opening configured for receiving a fastening device, wherein the movable arm structure is configured for rotating around the fastening device relative to the vehicle door, wherein the receiving opening has an elongated configuration and is extending in a first direction along a first axis through the inner socket, wherein a slot is arranged in a side wall structure of the outer socket, wherein the inner socket has a locking member extending from the inner socket through the slot to an outer side of the outer socket, wherein the locking member is configured for releasably attaching the inner socket to the outer socket, wherein the inner socket has an outer surface and the outer socket has an inner surface, wherein the outer surface of the inner socket is arranged in connection to the inner surface of the outer socket, wherein upon rotational displacement of the inner socket relative to the outer socket the outer surface of the inner socket is configured to move relative to the inner surface of the outer socket, wherein the outer surface of the inner socket extends in a second direction, wherein the second direction is different from the first direction, wherein the method comprises the steps:

unlocking the inner socket from the outer socket by the locking member to an unlocked state for allowing rotational displacement of the inner socket relative to the outer socket;

rotatably displacing the inner socket relative to the outer socket, wherein the rotational displacement of the inner socket relative to the outer socket is changing the first direction of the receiving opening relative to the outer socket, and displacing the inner socket relative to the outer socket to a desired position; and locking the inner socket to the outer socket by the locking member to a locked state for preventing rotational displacement of the inner socket relative to the outer socket.

* * * * *